(12) United States Patent
Nadeau et al.

(10) Patent No.: US 7,990,888 B2
(45) Date of Patent: Aug. 2, 2011

(54) SYSTEM AND METHODS FOR NETWORK REACHABILITY DETECTION

(75) Inventors: Thomas D. Nadeau, Hampton, NH (US); Azhar Mohammed Sayeed, Shrewsbury, MA (US); Michael T. Piecuch, Nashua, NH (US); James N. Guichard, Groton, MA (US); Jean-Phillipe Vasseur, Dunstable, MA (US); George L. Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 1608 days.

(21) Appl. No.: 11/072,082

(22) Filed: Mar. 4, 2005

(65) Prior Publication Data

US 2006/0198321 A1  Sep. 7, 2006

(51) Int. Cl.
*H04L 12/28* (2006.01)
*H04L 12/56* (2006.01)
(52) U.S. Cl. .................. 370/254; 370/392; 370/401
(58) Field of Classification Search .................. None
See application file for complete search history.

(56) References Cited

U.S. PATENT DOCUMENTS

| 6,205,488 | B1 | 3/2001 | Casey et al. | 370/248 |
|---|---|---|---|---|
| 6,215,765 | B1 | 4/2001 | McAllister et al. | 370/217 |
| 6,222,824 | B1 | 4/2001 | Marin et al. | 370/230 |
| 6,337,861 | B1 * | 1/2002 | Rosen | 370/389 |
| 6,396,810 | B1 | 5/2002 | Hebel | 370/229 |
| 6,459,682 | B1 | 10/2002 | Ellesson et al. | 370/235 |
| 6,477,522 | B1 | 11/2002 | Young | 707/2 |

(Continued)

FOREIGN PATENT DOCUMENTS

CN  1472924 A  2/2004

(Continued)

OTHER PUBLICATIONS

International Search Report, Aug. 7, 2007, p. 1.

(Continued)

*Primary Examiner* — Chirag G Shah
*Assistant Examiner* — Suk Jin Kang
(74) *Attorney, Agent, or Firm* — Brinks Hofer Gilson & Lione

(57) ABSTRACT

A mechanism for ASBRs to identify the originating node, or router, in an LSP conversant autonomous system (AS), such as an MPLS VPN environment, maintains the identity of the originating node and successive nodes in subsequent autonomous systems along the path to the node to be pinged. The identity of the transporting nodes is stored in a stack or other object associated with the ping request (ping), such that the pinged node may employ the stored identity as a set of return path routing information. Successive ASBRs store their identity on the stack, in an ordered manner, along the path to the destination. Upon reaching the destination (ping) node, the destination node employs the identity of the first node on the stack to send the acknowledgment, or ping response. Each successive ASBR, therefore, pops (retrieves) the next node identity from the stack and redirects (sends) the ping response to the retrieved node.

24 Claims, 8 Drawing Sheets

U.S. PATENT DOCUMENTS

| | | | |
|---|---|---|---|
| 6,662,223 B1 | 12/2003 | Zhang et al. | 709/224 |
| 6,700,874 B1 | 3/2004 | Takihiro et al. | 370/248 |
| 6,807,515 B2 | 10/2004 | Vogel et al. | 702/188 |
| 6,813,240 B1 | 11/2004 | Shah | 370/228 |
| 6,813,242 B1 | 11/2004 | Haskin et al. | 709/224 |
| 6,891,795 B1 | 5/2005 | Hamachi et al. | 370/227 |
| 6,963,927 B1 | 11/2005 | Lee et al. | 709/241 |
| 6,965,577 B1 * | 11/2005 | Murphy | 370/255 |
| 7,076,559 B1 * | 7/2006 | Ghanwani et al. | 709/230 |
| 7,080,141 B1 | 7/2006 | Baekelmans et al. | 370/389 |
| 7,120,118 B2 | 10/2006 | Rajagopal et al. | 370/237 |
| 7,120,819 B1 | 10/2006 | Gürer et al. | 714/4 |
| 7,139,278 B2 * | 11/2006 | Gibson et al. | 370/401 |
| 7,154,858 B1 | 12/2006 | Zhang et al. | 370/252 |
| 7,280,486 B2 * | 10/2007 | Suri | 370/248 |
| 7,382,738 B2 | 6/2008 | Ravindran et al. | 370/254 |
| 7,447,167 B2 | 11/2008 | Nadeau et al. | 370/250 |
| 7,463,591 B1 * | 12/2008 | Kompella et al. | 370/248 |
| 7,466,655 B1 | 12/2008 | Zhao | 370/238 |
| 7,471,679 B2 * | 12/2008 | Lee | 370/390 |
| 2001/0029543 A1 | 10/2001 | Iwata et al. | 709/233 |
| 2002/0093954 A1 | 7/2002 | Weil et al. | 370/389 |
| 2002/0118636 A1 | 8/2002 | Phelps et al. | 370/222 |
| 2002/0145981 A1 | 10/2002 | Klinker et al. | 370/244 |
| 2002/0165957 A1 | 11/2002 | Devoe et al. | 709/224 |
| 2003/0039212 A1 | 2/2003 | Lloyd et al. | 370/235 |
| 2003/0043755 A1 | 3/2003 | Mitchell | 370/252 |
| 2003/0048754 A1 | 3/2003 | Bruckman | 370/252 |
| 2003/0048790 A1 * | 3/2003 | McAllister et al. | 370/395.2 |
| 2003/0055925 A1 | 3/2003 | McAlinden | 709/221 |
| 2003/0058804 A1 | 3/2003 | Saleh et al. | 370/254 |
| 2003/0076825 A1 | 4/2003 | Guruprasad | 370/227 |
| 2003/0117962 A1 | 6/2003 | Mattson et al. | 370/389 |
| 2003/0118036 A1 | 6/2003 | Gibson et al. | 370/401 |
| 2003/0133443 A1 | 7/2003 | Klinker et al. | 370/353 |
| 2003/0147346 A1 | 8/2003 | Kanakubo | 370/254 |
| 2003/0149919 A1 | 8/2003 | Greenwald et al. | 714/43 |
| 2003/0156543 A1 | 8/2003 | Sahinoglu et al. | 370/389 |
| 2004/0081101 A1 | 4/2004 | Bennett | 370/252 |
| 2004/0179471 A1 | 9/2004 | Mekkittikul et al. | 370/218 |
| 2004/0190526 A1 | 9/2004 | Kumar et al. | 370/395.21 |
| 2004/0193709 A1 | 9/2004 | Selvaggi et al. | 709/224 |
| 2004/0199627 A1 | 10/2004 | Frietsch | 709/224 |
| 2004/0210892 A1 | 10/2004 | Sharma | 717/168 |
| 2004/0218542 A1 | 11/2004 | Lee | 370/248 |
| 2004/0218595 A1 | 11/2004 | Acharya et al. | 370/351 |
| 2004/0233859 A1 | 11/2004 | Martin | |
| 2005/0013259 A1 | 1/2005 | Papoushado et al. | 370/217 |
| 2005/0018647 A1 | 1/2005 | Lebrun et al. | 370/216 |
| 2005/0022105 A1 | 1/2005 | Proulx et al. | 718/100 |
| 2005/0053005 A1 | 3/2005 | Cain et al. | 370/235 |
| 2005/0083835 A1 | 4/2005 | Prairie et al. | 370/224 |
| 2005/0207349 A1 * | 9/2005 | Nagami et al. | 370/241 |
| 2005/0281192 A1 | 12/2005 | Nadeau et al. | 370/395.5 |
| 2006/0013142 A1 * | 1/2006 | Hongal et al. | 370/248 |
| 2006/0126495 A1 | 6/2006 | Guichard et al. | 370/216 |
| 2006/0168208 A1 | 7/2006 | Nagami | 714/27 |
| 2006/0182034 A1 | 8/2006 | Klinker et al. | 370/238 |
| 2006/0182122 A1 | 8/2006 | Davie et al. | 370/392 |
| 2006/0215577 A1 | 9/2006 | Guichard et al. | 370/254 |
| 2006/0215579 A1 | 9/2006 | Nadeau et al. | 370/220 |
| 2006/0262772 A1 | 11/2006 | Guichard et al. | 370/351 |
| 2006/0268682 A1 | 11/2006 | Vasseur | 370/228 |
| 2007/0025241 A1 * | 2/2007 | Nadeau et al. | 370/229 |
| 2007/0091897 A1 | 4/2007 | Lee et al. | 370/241.1 |
| 2007/0214388 A1 | 9/2007 | Auvenshine et al. | 370/400 |
| 2007/0280199 A1 | 12/2007 | Rong | 370/351 |
| 2008/0056142 A1 | 3/2008 | Arnold et al. | 370/248 |
| 2008/0080507 A1 | 4/2008 | Swallow et al. | 370/244 |
| 2008/0095045 A1 | 4/2008 | Owens et al. | 370/248 |
| 2008/0151746 A1 | 6/2008 | Vasseur et al. | |
| 2008/0205284 A1 | 8/2008 | Azad | |
| 2008/0304494 A1 | 12/2008 | Yokoyama | |
| 2009/0003223 A1 | 1/2009 | McCallum et al. | |
| 2009/0116396 A1 | 5/2009 | Regan et al. | |

FOREIGN PATENT DOCUMENTS

| | | | |
|---|---|---|---|
| JP | 2005-269460 | * | 3/2004 |
| WO | WO 03/049342 A2 | | 6/2003 |
| WO | WO 2004/056047 A1 | | 7/2004 |

OTHER PUBLICATIONS

Chinese Office Action Dated Nov. 28, 2008, for Chinese Application No. 200680004044.5.

Chinese Office Action dated Aug. 1, 2008, for Application No. 200680010074.7, pp. 1-4.

Chinese Office Action dated Dec. 26, 2008, with English translation for Application No. 200680004006.X, pp. 1-15.

Chinese Office Action dated Mar. 20, 2009, for Application No. 200680010074.7, pp. 1-3.

PCT International Search Report (PCT Articles 18 and Rules 43 and 44), pp. 1-3.

Kompella, Kireeti, Swallow, George, draft-ietf-mpls-lsp-ping-08.txt, ietf.org, dated Feb. 2005, pp. 1-43.

Stokes et al., Testing Hierarchical Virtual Private LAN Services, Jun. 2002, pp. 1-25.

European Search Report and Opinion, dated Nov. 27, 2009, pp. 1-7, European Patent Application No. 06739254.8-1249, European Patent Office, The Netherlands.

Office Action, dated Mar. 5, 2010, pp. 1-28, U.S. Appl. No. 11/313,283, U.S. Patent and Trademark Office, Virginia.

Office Action, dated Jul. 8, 2010, pp. 1-20, U.S. Appl. No. 11/328,436, U.S. Patent and Trademark Office, Virginia.

Notice of Abandonment, dated Jun. 16, 2010, pp. 1-2, U.S. Appl. No. 11/086,007, U.S. Patent and Trademark Office, Virginia.

Office Action, dated Aug. 5, 2010, pp. 1-2, U.S. Appl. No. 11/771,551, U.S. Patent and Trademark Office, Virginia.

Allan, D., Nadeau, T., RFC 4378—A Framework for Multi-Protocol Label Switching (MPLS) Operations and Management (OAM), dated Feb. 2006, pp. 1-11, IETF, www.ietf.org.

Cisco IP Solution Center MPLS VPN Management 4.2, dated 2006, pp. 1-6, Cisco Systems, Inc., San Jose, California.

Cisco Multiprotocol Label Switching Management Strategy, dated 2004, pp. 1-8, Cisco Systems, Inc., San Jose, California.

Lewis et al., Troubleshooting Virtual Private Networks, Chapter Title: Configuring MPLS VPNs, May 2004, pp. 1-17, Cisco Press, http://proquest.safaribooksonline.com.

Kompella, K., Pan, P., Sheth, N., Cooper, D., Swallow, G., Wadhwa, S., Bonica, R., Detecting MPLS Data Plane Failures—draft-ietf-mpls-lsp-ping-03.txt, dated Jun. 2003, pp. 1-23, IETF, www.ietf.org.

MPLS OAM Tools for Troubleshooting MPLS Networks, dated 2004, pp. 1-44, Cisco Systems, Inc., San Jose, California.

MPLS VPN—VRF Selection Based on Source IP Address, dated 2004, pp. 1-18, Cisco Systems, Inc., San Jose, California.

Rosen, E., Viswanathan, A., Callon, R., RFC 3031—Multiprotocol Label Switching Architecture, dated Jan. 2001, pp. 1-57, IETF, www.ietf.org.

Aissaoui, M., Bocci, M., Watkinson, D., Shah, H., Doolan, P., Busschbach, P., Delord, S., OAM Procedures for VPWS Interworking—draft-aissaoui-l2vpn-vpws-lw-oam-04.txt, dated Sep. 2005, pp. 1-23, IETF, www.ietf.org.

Nadeau, T., Morrow, M., Swallow, G., Allan, D., Matsushima, S., OAM Requirements for MPLS Networks—draft-ietf-mpls-oam-requirements-02.txt, dated Jun. 2003, pp. 1-13, IETF, www.ietf.org.

Bryant, S., Swallow, G., Martini, L., McPherson, D., RFC 4385—Pseudowire Emulation Edge-to-Edge (PWE3) Control Word for Use over an MPLS PSN, dated Feb. 2006, pp. 1-12, IETF, www.ietf.org.

Lewis et al., Troubleshooting Virtual Private Networks, Chapter Title: Troubleshooting MPLS VPNs, May 2004, pp. 1-59, Cisco Press, http://proquest.safaribooksonline.com.

Lewis et al., Troubleshooting Virtual Private Networks, Chapter Title: Troubleshooting Tools, May 2004, pp. 1-3, Cisco Press, http://proquest.safaribooksonline.com.

Martini, L., Rosen, E., El-Aawar, N., Smith, T., Heron, G., RFC 4447—Pseudowire Setup and Maintenance Using the Label Distribution Protocol (LDP), dated Apr. 2006, pp. 1-31, IETF, www.ietf.org.

Nadeau, T., Morrow, M., Busschbach, P., Aissaoui, M., Pseudo Wire (PW) OAM Message Mapping—draft-ietf-pwe3-oam-msg-map-03.txt, dated Sep. 2005, pp. 1-20, IETF, www.ietf.org.

Martini, L., Metz, C., Nadeau, T., Duckett, M., Balus, F., Segmented Pseudo Wire—draft-ietf-pwe3-segmented-pw-02.txt, dated Mar. 2006, pp. 1-30, IETF, www.ietf.org.

Nadeau, T., Aggarwal, R., Pseudo Wire Virtual Circuit Connectivity Verification (VCCV), dated Mar. 2004, pp. 1-14, IETF, www.ietf.org.

How to Troubleshoot the MPLS VPN, dated 2005, pp. 1-7, Cisco Systems, Inc., San Jose, California.

Awduche, D., Malcolm, J., Agogbua, J., O'Dell, M., McManus, J., RFC 2702—Requirements for Traffic Engineering Over MPLS, dated Sep. 1999, pp. 1-28, IETF, www.ietf.org.

Cisco MPLS Diagnostics Expert, dated 2005, pp. 1-11, White Paper, Cisco Systems, Inc., San Jose, California.

Welcher, P., BGP and MPLS-Based VPNs, dated Oct. 4, 2000, pp. 1-8, Chesapeake Netcraftsmen, www.netcraftsmen.net.

Brooks, A., Sacks, L., A Methodology for Monitoring LSP Availability in MPLS Networks, dated 2002, pp. 1-4, University College London, www.ee.ucl.ac.uk,.

Rosen, E., Rekhter, Y., RFC 4364—BGP/MPLS IP Virtual Private Networks (VPNs), dated Feb. 2006, pp. 11-12, 16 and 24-26, The Internet Society, www.rfc-editor.org.

Kompella, K., Swallow, G., RFC 4379—Detecting Multi-Protocol Label Switched (MPLS) Data Plane Failures, dated Feb. 2006, pp. 1-47, IETF, www.ietf.org.

Office Action, dated Nov. 30, 2009, pp. 1-10, U.S. Appl. No. 11/086,007, U.S. Patent and Trademark Office, Virginia.

Notice of Allowance, dated Nov. 19, 2010, pp. 1-8, U.S. App. No. 11/328,436, U.S. Patent and Trademark Office, Virginia.

Office Action, dated Jan. 5, 2011, pp. 1-14, U.S. Appl. No. 11/771,551, U.S. Patent and Trademark Office, Virginia.

Office Action, dated Mar. 29, 2011, all pages, U.S. Appl. No. 11/771,551, U.S. Patent and Trademark Office, Virginia.

Notice of Allowance, dated Mar. 17, 2011, all pages, U.S. Appl. No. 11/313,283, U.S. Patent and Trademark Office, Virginia.

* cited by examiner

SYSTEM AND METHODS FOR NETWORK REACHABILITY DETECTION

BACKGROUND

Virtual Private Networks are becoming an increasingly popular mechanism to interconnect multiple remote sites of a common entity, such as a corporation, university, governmental institution, or other enterprise. A VPN allows remote sites to interconnect as if colocated by providing message transport, security, and node addressing. Such a VPN interconnects multiple subnetworks, or local area networks (LANs), of an enterprise such as a corporation, university, or distributor, for example. The subnetworks, in turn, interconnect with each other via a private or public access network such as the Internet, intranets, VPNs and the like.

Such a subnetwork interconnection is typically known as a core network, and includes service providers having a high speed backbone of routers and trunk lines. Each of the subnetworks and the core networks have entry points known as edge routers, through which traffic ingressing and egressing from the network flows. The core network has ingress/egress points handled by nodes known as provider edge (PE) routers, while the subnetworks have ingress/egress points known as customer edge (CE) routers, discussed further in Internet Engineering Task Force (IETF) RFC 2547bis, concerning Virtual Private Networks (VPNs).

An interconnection between the subnetworks of a VPN, therefore, typically includes one or more core networks. Each of the core networks is usually one or many autonomous systems (AS), meaning that it employs and enforces a common routing policy among the nodes (routers) included therein. Accordingly, the nodes of the core networks often employ a protocol operable to provide high-volume transport with path based routing, meaning that the protocol not only specifies a destination (as in TCP/IP). Thus, the protocol does not merely specify a destination, as in TCP/IP; it implements an addressing strategy that allows for unique identification of end points, and also allows specification of a particular routing path through the core network. One such protocol is the Multiprotocol Label Switching (MPLS) protocol, defined in Internet Engineering Task Force (IETF) RFC 3031. MPLS is a protocol that combines the label-based forwarding of ATM networks, with the packet-based forwarding of IP networks and then builds applications upon this infrastructure.

Traditional MPLS, and more recently Generalized MPLS (G-MPLS) networks as well, extend the suite of IP protocols to expedite the forwarding scheme used by conventional IP routers, particularly through core networks employed by service providers (as opposed to end-user connections or taps). Routers, to date, have used complex and time-consuming route lookups and address matching schemes to determine the next hop for a received packet, primarily by examining the destination address in the header of the packet. MPLS has greatly simplified this operation by basing the forwarding decision on a simple label. Another major feature of MPLS is its ability to place IP traffic on a particular defined path through the network. Such path specification capability is generally not available with conventional IP traffic. In this way, MPLS provides bandwidth guarantees and other differentiated service features for a specific user application (or flow). Current IP-based MPLS networks are emerging for providing advanced services such as bandwidth-based guaranteed service, priority-based bandwidth allocation, and pre-emption services.

For each specific service, a table for a forwarding equivalence class (FEC) is created to represent a group of flows with the same traffic-engineering requirements. A specific label is then bound to an FEC. At the ingress of an MPLS network, incoming IP packets are examined and assigned a "label" by a label edge router (LER). The labeled packets are then forwarded along an LSP, where each label-switched router (LSR) makes a switching decision based on the packet's label field. Such LSRs avoid examining the IP headers of the packets to find an output port (next hop). An LSR simply strips off the existing label and applies a new label for the next hop. The label information base (LIB) provides an outgoing label (to be inserted into the packet) and an outgoing interface (based on an incoming label on an incoming interface).

Therefore, MPLS uses a technique called label switching (or swapping or popping) as a means to transport data across a network. The routers within an MPLS network that are responsible for label processing are known as Label Switching Routers (LSRs), and the path followed by data is known as a Label Switched Path (LSP). Upon entry to an MPLS network, such as from a CE router via a PE router, an MPLS-specific header is inserted at the front of each packet to in effect, re-encapsulate it. The MPLS header contains a stack of labels—one or more—that uniquely identify the switching path between any two LSRs. This label tells adjacent switching nodes how to process and forward the data. As each packet is received by a node, it may push a new label onto the stack of a packet before forwarding it on, pop one from the stack, or swap one or more of the labels with new ones. The path of the packet through the network is defined by its initial labeling. Accordingly, the subsequent mapping of labels is consistent at each node so as to form a complete label switched path between the ingress to and the egress from the MPLS network.

Therefore, a Virtual Private Network (VPN) typically employs one or more core networks to interconnect a plurality of local networks, such as LANs, by a VPN service operable to provide transport, routing and security to message traffic between the subnetworks, such that nodes of each sub-LAN can communicate with nodes of other sub-LANs as members of the same VPN. In a typical VPN arrangement, the particular subnetworks may be individual sites of a large business enterprise, such as a bank, retail, or large corporation, having multiple distinct sites each with a substantial subnetwork. A conventional VPN in such an environment is well suited to provide the transparent protection of communication between the subnetworks, such as ensuring protection of transported data via security and encryption, routing policies, and access control among valid users via privileges and access credentials, for example. Message traffic between the VPN subnetworks, therefore, egresses from an originating subnet via a CE router, enters a core network denoting an autonomous system (AS) via a PE router, and traverses one or more AS core networks to a remote PE router, where it enters a remote VPN subnet via a CE router operable to deliver the message traffic to an IP destination.

SUMMARY

Virtual Private Networks, or VPNs, therefore, are a popular mechanism for interconnecting remote related sites of an organization or enterprise, including various configurations such as LANs, intranets, extranets, and other interconnection mechanisms employed between multiple related but remote sites to provide secure, seamless interconnection to the organization or enterprise as a whole. A VPN interconnects multiple subnetworks, or local area networks (LANs), of an enterprise such as a corporation, university, or distributor, for example. The subnetworks, in turn, interconnect with each other via a public access network such as the Internet. Such a subnetwork interconnection is typically known as a core network, and includes service providers having a high speed backbone of routers and trunk lines. Note that "routers," as discussed herein, refers to the various types of high-speed data switching devices typically employed in such networks, including but not limited to routers, switches, hubs, bridges and other connectivity devices employing a variety of mediums, such as electronic, optical, cellular, RF or other medium. Each of the subnetworks and the core networks has entry points known as edge routers, through which traffic ingressing and egressing from the network flows. The core network has ingress/egress points handled by nodes known as provider edge (PE) routers, while the subnetworks have ingress/egress points known as customer edge (CE) routers. Further, the core network may include multiple segments, in which each of the core network segments interconnects with other core network segments, also known as autonomous systems. An Autonomous System (AS) is defined by a common routing policy among the nodes of the AS. Autonomous System Border Routers (ASBRS) define ingress/egress points between one or more Autonomous Systems.

The edge routers often employ a specialized protocol particularly operable for serving network to network interconnections—i.e. edge router connections. One such protocol is the Border Gateway Protocol (BGP), for example, which interconnects CE and PE routers at the edge of the core network. In a VPN interconnecting multiple AS segments, certain protocols are often employed to favor such VPN routing. One such protocol is the MPLS protocol. In an MPLS environment, as indicated above, packets are often forwarded using the so-called LSP routing mechanism by employing the path label provided by such networks, by various techniques such as forwarding, autorouting, and static routing, as is known to those of skill in the art. MPLS is typically well suited for service provider core networks or medium to large enterprise networks, rather than end-user connections via a local LAN. Therefore, MPLS is often employed in an inter AS context in the core network. In such a core network, multiple autonomous systems interconnect using routers conversant in label switched routing via LSRs and LERs. LSRs are core devices (i.e. Labeled Switch Routers) that switch packets, and LERs are edge devices (i.e. Labeled Edge Routers) that connect with external networks, determine routes, and add or remove labels. An LSP, therefore, is a concatenation of switch hops that form an end-to-end forwarding path. An LSP starts at an ingress LER, crosses one or more LSRs, and ends at an egress LER.

When a packet arrives at an MPLS network, the ingress LER performs a substantial portion of the work of handling the packet. It examines the IP address of the packet, determines a route, assigns an LSP, and attaches a label. The packet is then forwarded into the LSP, where it is switched across a series of LSRs until it reaches the egress LER. The label is removed and the packet is forwarded on its way via standard IP routing.

One particular feature of MPLS is the ability to build virtual paths or circuits across IP networks. These Virtual Connections (VCs) are called label switched paths (LSPs). LSPs are similar to virtual circuits in ATM and frame relay networks in that they define a specific path between two points in a network. Labels are attached to packets, which assist MPLS nodes in forwarding packets along an LSP. The labels are like tracking slips on express delivery packages. They contain an index into a forwarding table, which specifies the next hop for the packet. As indicated above, nodes in the core MPLS network need not examine packets and perform next-hop routing tasks. The label carries the information that determines which path a packet should take. Conventional network systems often employ a so-called "Ping" to assess availability of a remote node. A typical ping is a small message sent to the remote node for which reachability status is sought. The message informs the remote node to send a response message, or acknowledgment, back to the sender to indicate the reachability of the remote node. The sending node identifies, based on the response or lack thereof, of the availability of the remote node and any associated subnetworks. Further, other information may be included, such as the latency time of the ping and the path traveled by the ping. In a VPN context, such as a VPN supported by MPLS, a ping may be employed to determine availability of a node or remote subnetwork, such as by pinging the PE router serving the remote VPN subnet. Such messages may also be used to trace the path taken by the LSP.

However, as indicated above, an MPLS network often operates as a core network between VPN subnetworks. Such an MPLS network often includes multiple autonomous systems (AS), each operating a particular routing policy. Often, an address of a particular node in an AS may not be recognized outside the AS. For example, in an environment employing labeled switch path routing (LSP), the path defined by such a label is specific to the AS, for traversing the particular AS employing the LSP, and may be known only to labeled switch routers (LSRs) within the particular autonomous system. Message traffic (i.e. packets) are assigned a label from an Autonomous System Border Router (ASBR) upon entering the AS. The assigned label identifies a path through the AS to an egress ASBR on a remote side of the AS. Therefore, the LSP label is not known outside the AS.

In a conventional VPN/MPLS environment, a message (packet) traversing multiple autonomous systems is transported between ASBRs at each ingress/egress point. Conventional ASBR routers, therefore, connect to other ASBR routers on the route to the destination. Each intermediate AS transports the packet from the ingress ASBR to the egress ASBR via the assigned label and corresponding LSP, and the egress ASBR transmits the packet to the ingress ASBR at the next AS along the route.

However, pinging in such conventional MPLS systems suffer from several shortcomings. The identity of the ping initiator may not be recognized beyond the originating AS. Traditional MPLS Pings do not span beyond an AS, due to difficulty with propagating an intra-AS address outside it's native AS. Accordingly, such conventional ASBRs employ a Time-To-Live (TTL) attribute or router alert label in Ping messages. The ASBRs set the TTL to 1 hop, indicating that the Ping message is to be terminated before leaving the originating AS. Setting the TTL to 1 ensured that packets did not propagate beyond the originating AS. Therefore, there is not a mechanism to perform a conventional MPLS ping beyond the ASBR. Accordingly, conventional pings cannot span multiple autonomous systems because the conventional ASBRs employing LSP routing cannot provide a return address for outgoing pings to a remote AS, VPN subnet (i.e. CE or PE router), or other destination.

Accordingly, configurations discussed further below substantially overcome the shortcoming of conventional MPLS ping operations by identifying the originating node, or router, in an LSP conversant AS, and maintaining the identity of the originating node and successive nodes in subsequent autonomous systems along the path (route) to the node to be pinged. The identity of the transporting nodes is stored in a stack or other object associated with the ping request (ping), such that the pinged node may employ the stored identity as a set of return addresses, or return path routing information. Successive ASBRs store their identity on the stack, in an ordered manner, along the path to the destination. Upon reaching the destination (ping) node, the destination node employs the identity of the first node on the stack to send the acknowledgment, or ping response. The first node from the stack, upon receiving the ping response, pops (retrieves) the second node from the stack as the node to redirect the ping response to. Each successive ASBR, therefore, pops (retrieves) the next node identity from the stack and redirects (sends) the ping response to the retrieved node. Since the identities of each of the ASBRs are pushed onto the stack in order, and since the ping response travels the same path as the ping (due to the nature of LSP), the identities (addresses) retrieved from the stack are valid LSP addresses according to each respective ASBR on the response path.

In further detail, in an autonomous system border router (ASBR), the method of assessing the state of a remote node via a labeled switch path as disclosed herein includes identifying a remote node from which an acknowledging response is requested, in which the remote node corresponds to a path including a sequence of border routers, and storing an entry indicative of an originator node of the acknowledging response request in a response request message. The originator transmits, from the originator node, the response request message to an egress border router included in the path to the remote node. The egress ASBR transmits the response request message to successive border routers on the path to the remote node in an iterative manner, and accumulates, in a nondestructive manner at each successive border router, an entry indicative of the identity of each the successive border routers on the path to the remote node.

In the exemplary arrangement, accumulating entries indicative of successive border routers traversed on the path to the identified remote node includes building a stack of successive edge nodes, in which the stack corresponds to a normalized field in the acknowledgement request message, such as via a protocol specification.

The response request message (i.e. ping) is operable to traverse a plurality of subnetworks defined by border routers indicative of ingress points to the respective subnetwork, each of the subnetworks being an autonomous system having an independent routing policy. At each respective AS subnetwork, a path is defined through each of the subnetworks via a predetermined label, in which the predetermined label is operable to be recognized by the border routers within the respective subnetwork. The accumulated entries are written to a stack and the non-destructive manner avoids overwriting successive accumulated entries such that retrieval of the entries is performable in a reverse order from which they were written. In the stack of return path routing information, the stack has a first address and successive addresses indicative of an ordered set of border nodes traversed by the acknowledgment request. Therefore, the accumulated entries are written to the stack of return path routing information in an ordered manner indicative of the path.

The destination (pinged) node generates the acknowledgment response, or ping reply, by receiving, at the destination node, the acknowledgment request, building an acknowledgment request response including the stack of return path routing information accumulated in the acknowledgment request, and transmitting the acknowledgment request response to the first return address on the stack.

Return transmission further includes forwarding the acknowledgment response back to the originator by retrieving the first address on the stack, such that the return address placed on the stack previous to the first address is the current first return address on the stack, transmitting the acknowledgment response to the retrieved first address, and repeating the retrieval and transmitting for each successive address on the return path routing information stack until the originator receives the acknowledgement response.

The network forwards the acknowledgement response message, in the exemplary configuration, according to forwarding rules, in which the forwarding rules further include transmitting, if an acknowledgment request is received, to the next route toward the ping destination, redirecting, if an acknowledgment response is received, to the next address on the stack, the ping response, and identifying, if the destination cannot be reached, the AS encountering the unreachability condition. Such forwarding rules enable bi-directional logic for handling acknowledgement request and response messages according to a single rule set. For security any privacy, upon encountering an error transmitting one of the acknowledgement request and the acknowledgment response, the receiving router may erase the routing history indicative of its specific portion of the path, such that successive interceptors of the message would be unable to examine the stack indicative of the path. In such cases, it is required that the ASBR still indicate the globally unique AS number, so as to facilitate troubleshooting of the failure condition. Further, in alternate configurations, successive return addresses may be stored by border routers, in which the border routers retain an identity of the previous border router indicative of the last hop in the previous autonomous system traversed by the message.

In particular VPN contexts, multiple paths may exist between a first subnetwork and a second subnetwork (i.e. autonomous systems), and the accumulated addresses are indicative of the path of the acknowledgement request such that the same path is enabled for the acknowledgement response. Otherwise, the request response may be unable to determine the proper AS corresponding to the original request.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Pinging remote nodes over routes or paths spanning autonomous systems employing LSP routing encounters the issue that the identity of the ping initiator may not be recognized beyond the originating AS. Traditional Pings do not span beyond an AS, due to difficulty with propagating an intra-AS address outside it's native AS. Conventional MPLS ASBRs and other LSRs employ a Time-To-Live (TTL) attribute in conjunction with such Ping messages, typically as part of the MPLS header. Each of the ASBRs set the TTL to 1 or introduce a router alert label, indicating that the ping message is to be intercepted before leaving the originating AS. Setting the TTL to 1 ensured that packets did not propagate beyond the originating AS. Therefore, there is not a mechanism to perform a conventional ping beyond the ASBR. Accordingly, conventional pings cannot span multiple autonomous systems because the conventional ASBRs employing LSP routing cannot provide return path routing information for outgoing pings to a remote AS, VPN subnet (i.e. CE or PE router), or other destination.

Configurations discussed herein provide a mechanism for ASBRs to identify the originating node, or router, in an LSP conversant AS, and maintain the identity of the originating node and successive nodes in subsequent autonomous systems along the path (route) to the node to be pinged. The identity of the transporting nodes is stored in a stack or other object associated with the ping request (ping), such that the pinged node may employ the stored identity as a set of return addresses, return path routing information, or other information suitable for identifying the path of the response request message (i.e. ping). Successive ASBRs store their identity on the stack, in an ordered manner, along the path to the destination, such that the collective routing information of nodes traversed enables a reverse traversal to the originating node. Such routing information may be an IP address or other identifier to enable recreation of the path from the pinged recipient back to the originator. Upon reaching the destination (ping) node, the destination node employs the identity of the first node on the stack to send the acknowledgment, or ping response. The first node from the stack, upon receiving the ping response, pops (retrieves) the second node from the stack as the node to redirect the ping response to. Each successive ASBR, therefore, pops (retrieves) the next node identity from the stack and redirects (sends) the ping response to the retrieved node. Since the identities of each of the ASBRs are pushed onto the stack in order, and since the ping response travels the same path as the ping (due to the nature of LSP), the identities (addresses) retrieved from the stack are valid LSP addresses according to each respective ASBR on the response path.

Figure 1:
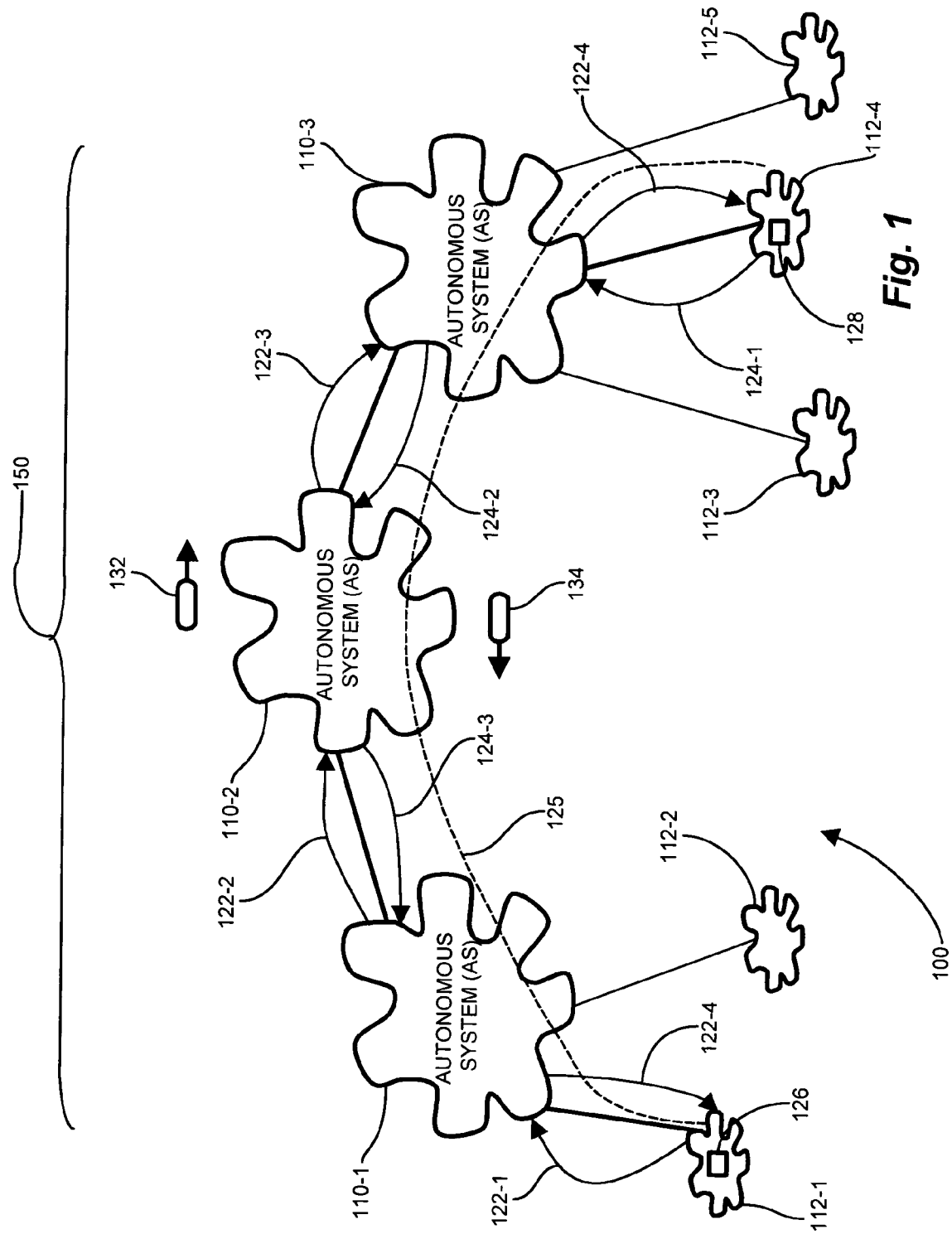
FIG. 1 is a context diagram of a network communications environment having a core network including multiple Autonomous Systems (AS) operable for use with the present invention.

FIG. 1 is a context diagram of a network communications environment having a core network including multiple Autonomous Systems (AS) operable for use with the present invention. Referring to FIG. 1, an exemplary VPN environment 100 includes a plurality of autonomous systems 110-1 . . . 110-3 (110, generally) interconnecting remote local LANs, or prefixes 112-1 . . . 112-5 (112, generally), for providing VPN connectivity to users (not specifically shown) connected to the LANs 112. The autonomous systems 110 collectively define a core network 150 interconnecting the remote prefixes 112 as such a Virtual Private Network (VPN) environment 100. In the exemplary configuration, the prefixes 112 are typically local LANs supporting a particular corporate, institutional, or enterprise site, for example, and the core network 150 includes the Internet, various intranets, or a combination of both.

In the course of normal routing operations, it is common for a router, or node, to "ping" another node to confirm connectivity or other path status such as delay, jitter, packet loss, etc. Such ping operations, as indicated above, involve sending an acknowledgement request message, or ping, to the node for which status is sought, and receiving an acknowledgment response message, or ping reply, from the pinged node to indicate availability. For example, routing protocols typically employ pings to verify reachability of certain nodes to ascertain availability of various paths and subnetworks available via the pinged node. Further, such pings may be used by a Path Verification Protocol (PVP), discussed further in copending U.S. patent application Ser. No. 11/001,149 entitled "SYSTEM AND METHODS FOR DETECTING NETWORK FAILURE," filed Dec. 1, 2004 assigned to the assignee of the present application and incorporated herein by reference. Other uses for such pings are common and known to those of skill in the art.

As shown in FIG. 1, in routers employing LSP routing, conventional pings cannot span multiple autonomous systems because the path information is local to each respective AS 110. However, the path to the pinged node may traverse a plurality of autonomous systems 110, as a series of hops shown as arrows 122-N, 124-N, for the ping and ping reply, respectively.

The LSP ping mechanism, discussed further below, provides a mechanism for identifying the complete path 125 defined by the set of hops 122, 124, therefore enabling a ping and ping reply between nodes 126 and across multiple autonomous systems 110. In FIG. 1, an acknowledgment request message 132, sent by an originating node 126, follows the series of hops 122-1 . . . 122-4 to a destination node 128. The destination node 128, in a positive ping scenario (e.g. pinged node reachable), receives the acknowledgment request 132, and sends an acknowledgment response message 134, back over the same set of hops 124-1 . . . 124-4 defining the path 125 to the originator 126. If the acknowledgment response 134 (i.e. ping reply), denoted by hops 124-1 . . . 124-4, fails to reach the originator 126, then the remote "pinged" node 128 is deemed unavailable. Note that the ping originator 126 and destination 128 maybe any router, such as customer or provider edge (CE or PE) routers, autonomous system border routers (ASBRs), carrier's carrier PE or CE or other switching device interconnecting two or more autonomous systems, internal label switch (LSR) routers, or others. In an exemplary configuration, discussed below with respect to FIG. 3, PE routers employ the LSP ping, however alternate configurations may employ the LSP ping other nodes. In the case of a so called "carrier's carrier," the exemplary ASBRs would actually be called CsC-PEs. The difference in such an embodiment is that the return address that is pushed on at a CsC-PE includes an identifier to specify which routing table the address came from. Further, the originating node 126, such as a CE node in a typical LSP ping scenario, may be unaware of the inter-AS nature of the ping recipient 128. Accordingly, the path information retained by the response request 132 is not indicative of an inter-AS scenario until reaching the ASBR egressing from the originating AS.

Figure 2:
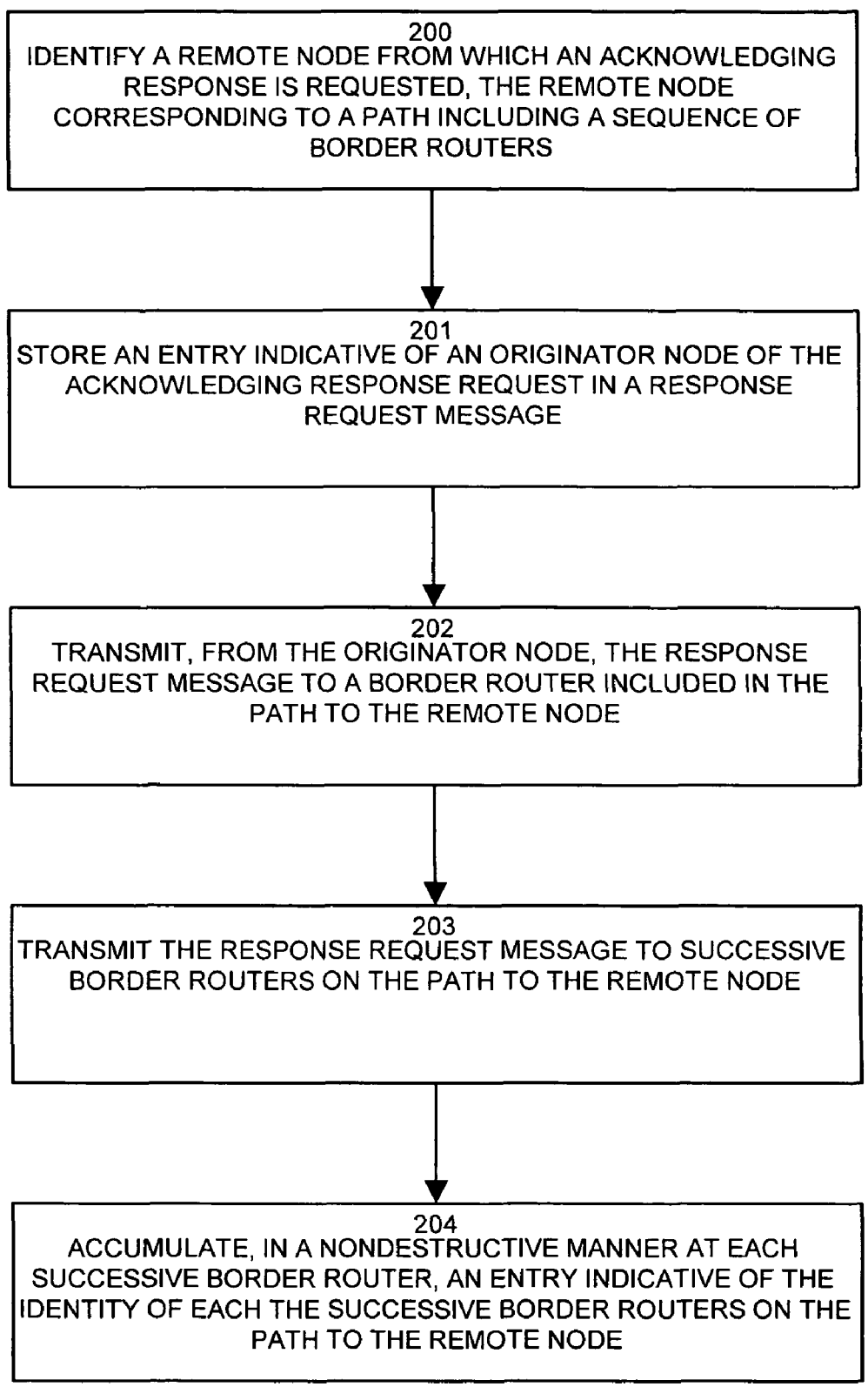
FIG. 2 is a flowchart of a ping operation via Labeled Switch Path routing between Autonomous System Border Routers (ASBRs) in a core network as in FIG. 1.

FIG. 2 is a flowchart of a ping operation via Labeled Switch Path routing between Autonomous System Border Routers (ASBRs) in a core network 150 as in FIG. 1. Referring to FIGS. 1 and 2, the method for performing an LSP ping involves assessing the state of a remote node 128 (i.e. the "pinged" router) via a labeled switch path through each respective AS 110. The node originating the ping 126 (originating node) identifies a remote node 128 from which an acknowledging response 134 is requested, in which the remote node 128 corresponds to a path 125 including a sequence of border routers (discussed further below in FIG. 3) through one or more autonomous systems 110, as depicted at step 200. The originating node 126 stores an entry indicative of the address of the originator node 126 of the acknowledging response request in a response request message 132, as depicted at step 201. The originator 126 then transmits, from the originator node (itself), the response request message 132 to a border router included in the path 125 to the remote node 128, such as an ASBR of the AS 110-1 on the path 125 to the remote node 128, as shown at step 202. The ASBR of the AS 110-1, as well as each subsequent border router in the traversed autonomous systems 110-N, transmits the response request message 132 to successive border routers on the path 125 to the remote node 128, according to forwarding rules 152, as depicted at step 203. The method accumulates, in a nondestructive manner at each successive border router, an entry indicative of the identity (i.e. address) of each the successive border routers on the path 134 to the remote node 128, as depicted at step 204, thus building a set of return path routing information operable to be employed for returning a request response message 134. In the exemplary configuration, the set of return path routing information is an ordered stack indicative of the path 125, as will now be described in further detail, however alternate mechanisms for accumulating the identify of the traversed autonomous systems 110 may be performed.

Figure 3:
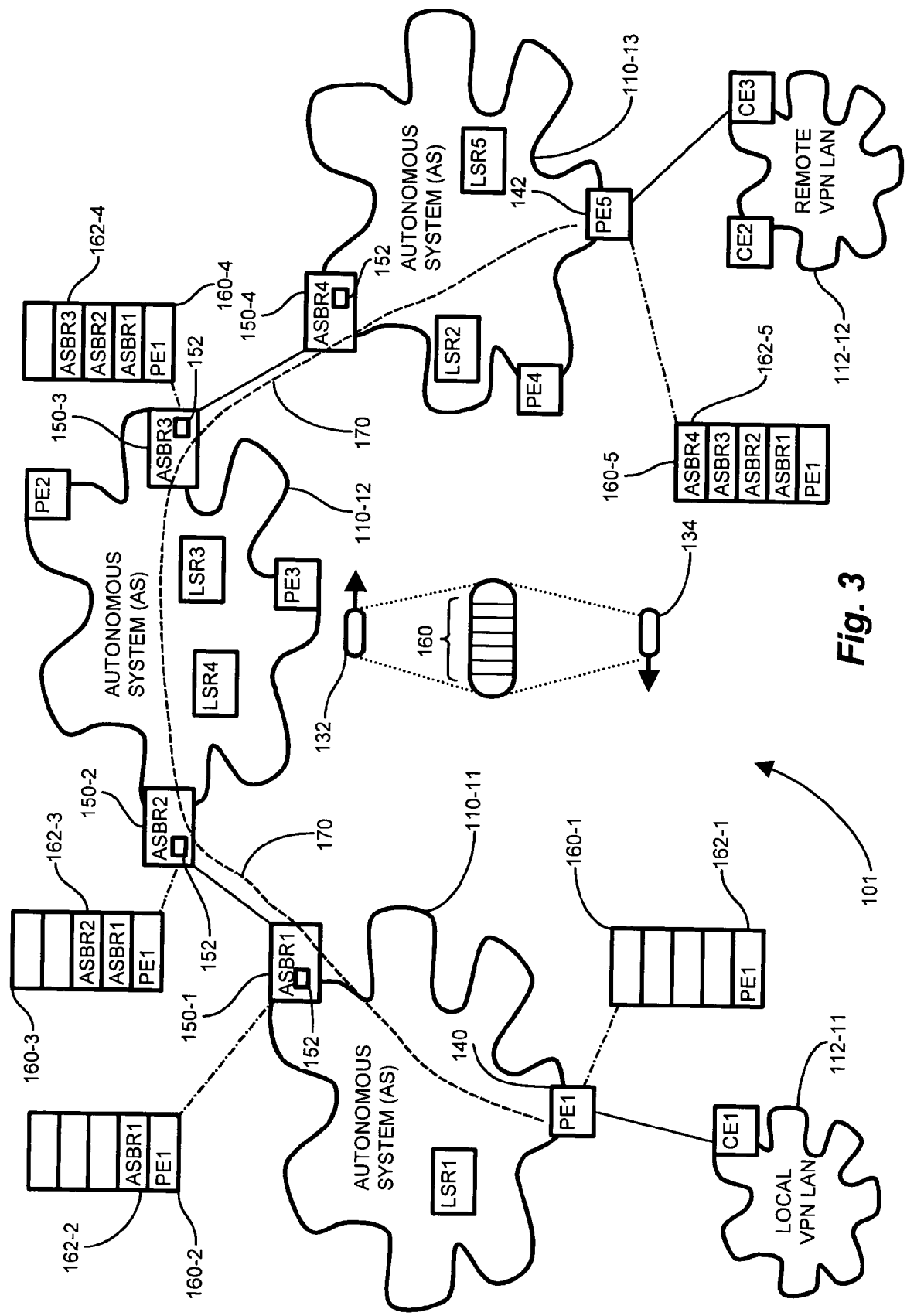
FIG. 3 is a block diagram illustrating the LSP Ping between ASBRs in the exemplary network of FIG. 1.
Figure 4:
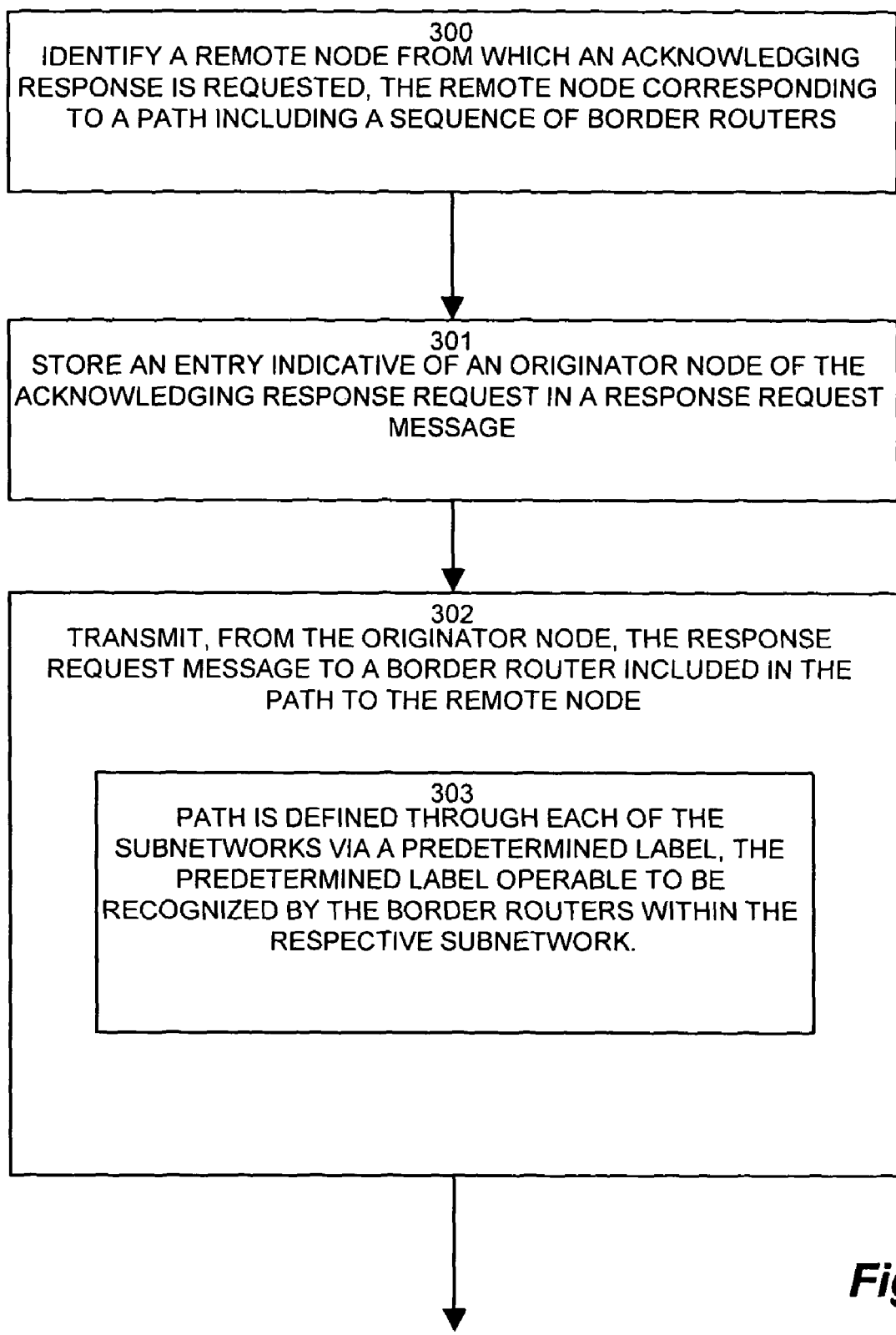
FIGS. 4-7 are a flowchart of the LSP Ping between a plurality of autonomous systems in greater detail.
Figure 5:
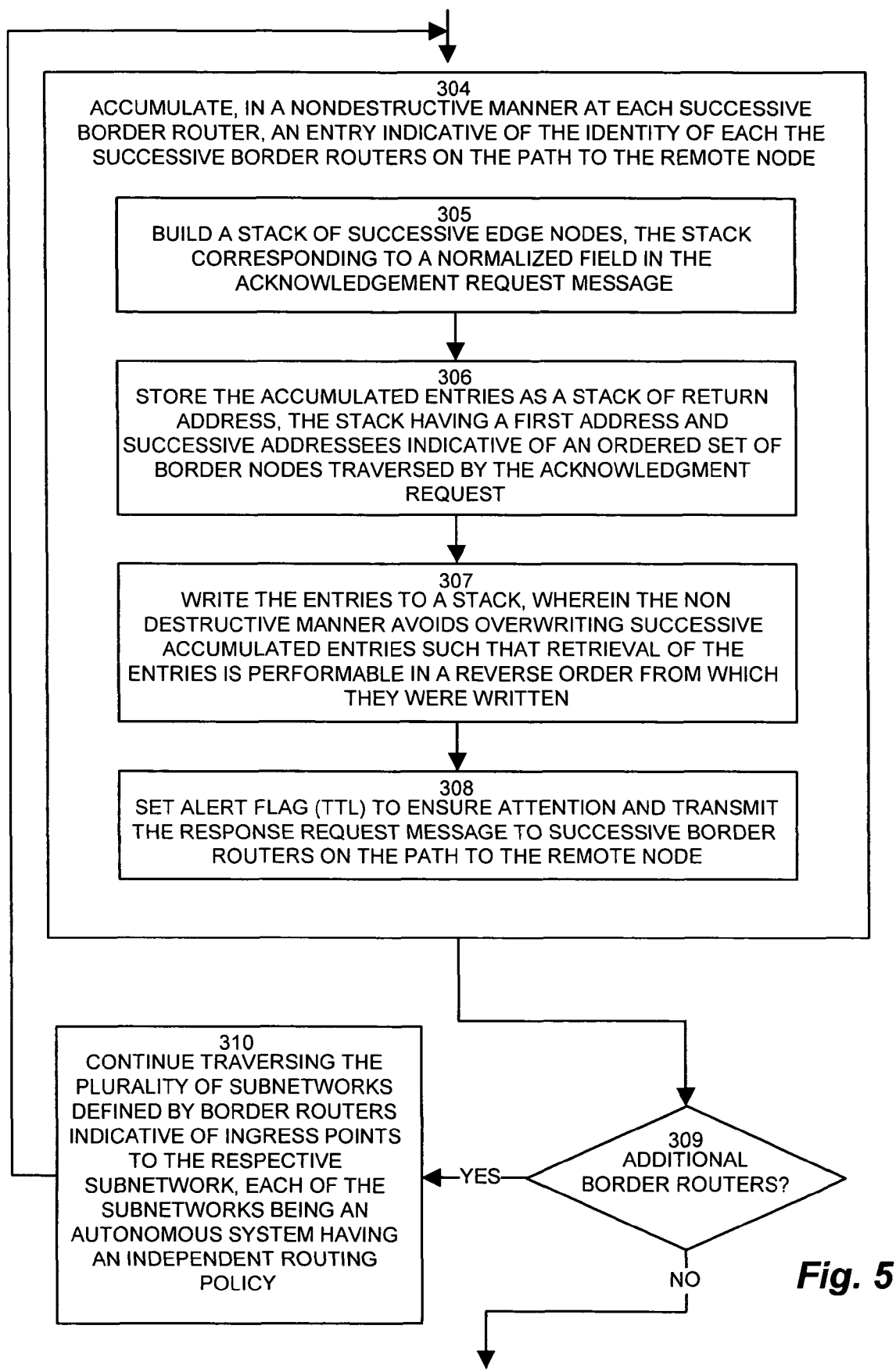
Figure 6:
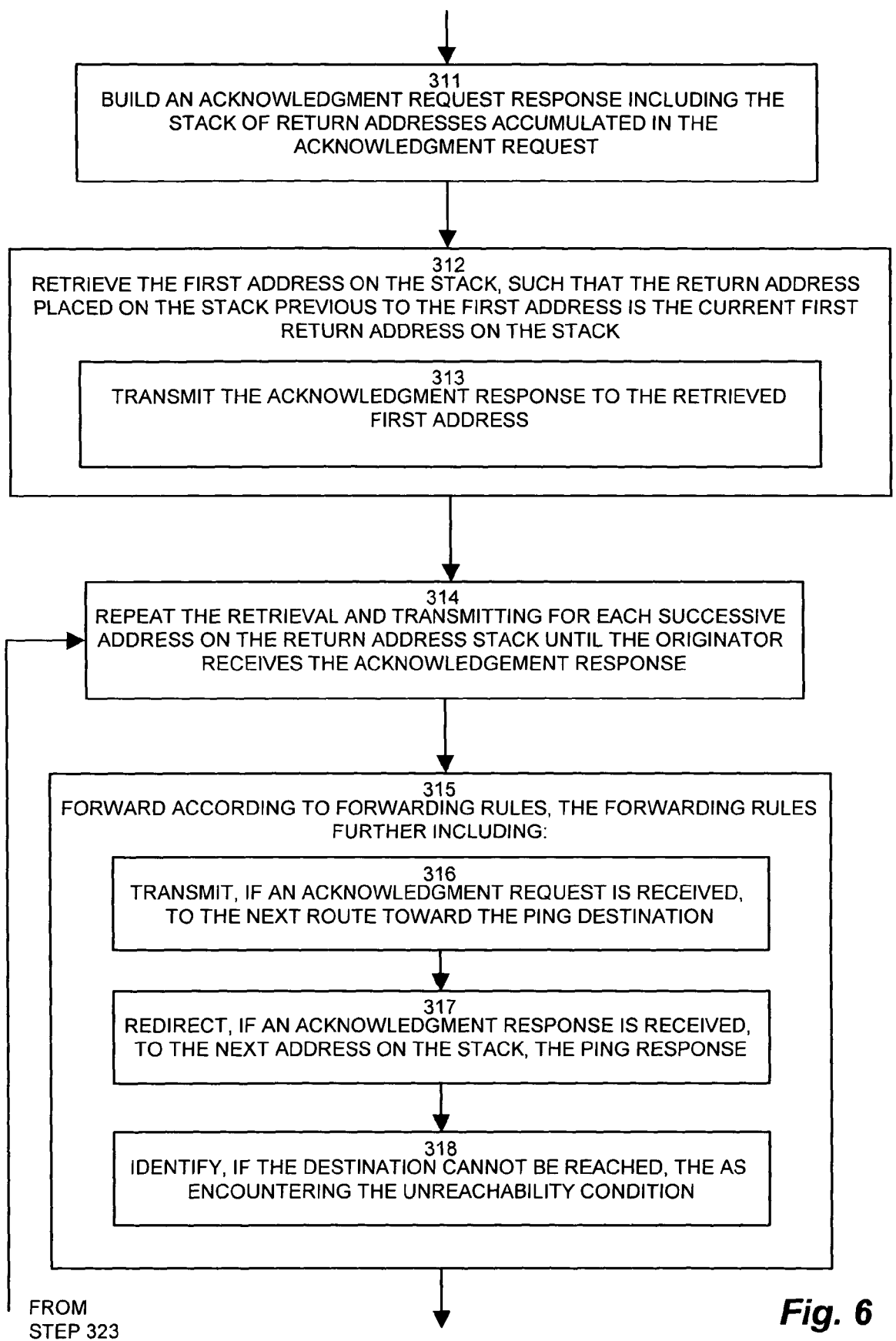
Figure 7:
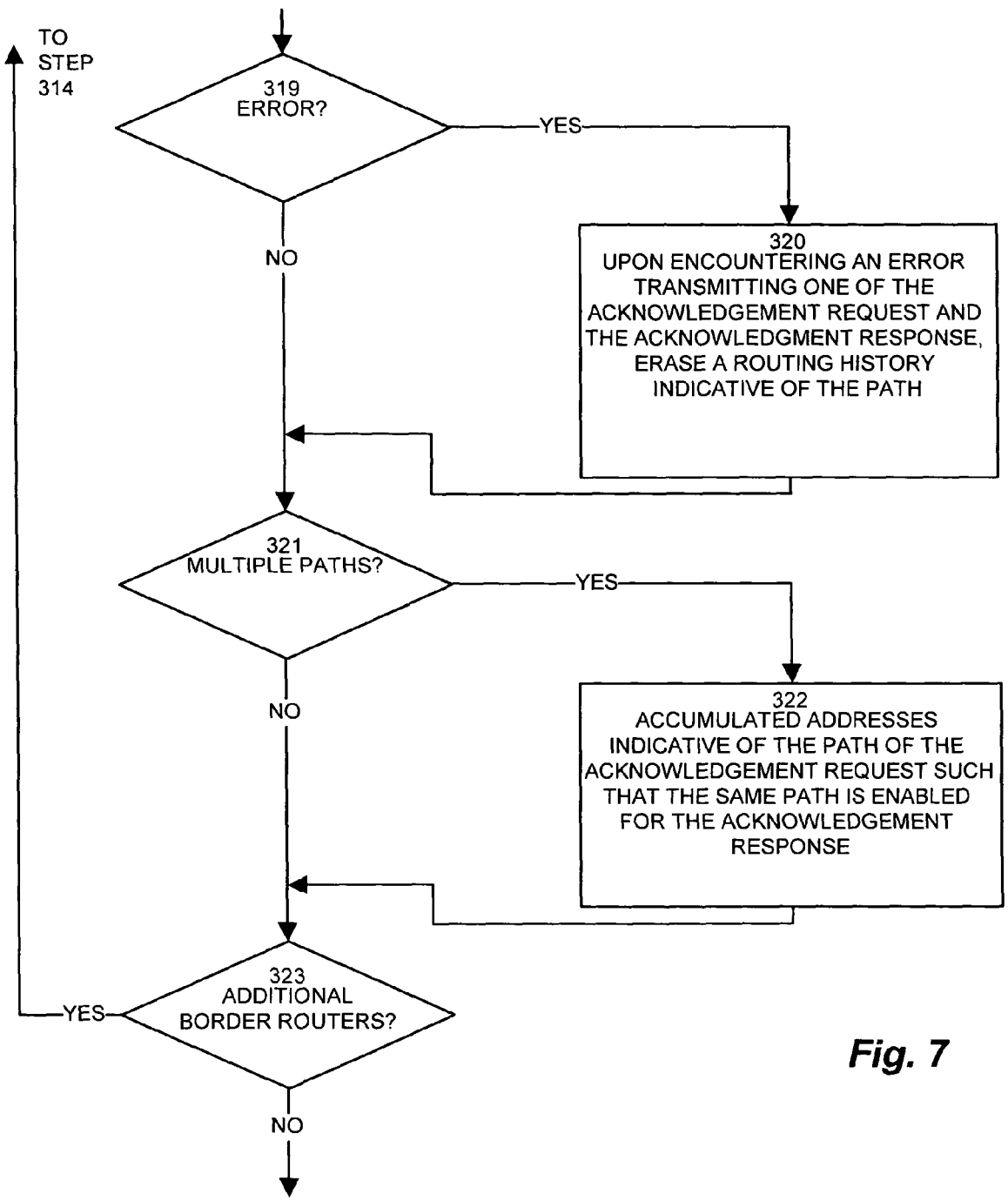

FIG. 3 is a block diagram illustrating the LSP Ping between ASBRs in the exemplary network of FIG. 1. Referring to FIGS. 1 and 3, router PE1 140 attempts to ping node PE5 142. Router PE1, in AS 110-11, generates an acknowledgment request message 132 including a return address stack 160, for storing the identity of successive routers traversed by the message 132. The stack 160 is shown at various stages of population 160-1 . . . 160-N (160, generally), having an ordered set of entries 160-1 . . . 160-N (160 generally), discussed further below. PE1 stores its identity as an element 162-1 in the return address stack 160-1, and transmits the message 132 to ASBR1 150, the border router to the adjacent AS 110-12. ASBR1 150-2 stores its identity in the next element 162-2 in the stack 160, and forwards the message to ASBR2 150-2, denoting the entry into AS 110-12. Similarly, ASBR2 writes element 162-3 to the stack 160-3, and transmits to ASBR3 150-3, defined as an egress router from AS 110-12, which writes the next return address 162-4 in stack 160-4. ASBR4 150-4 receives the acknowledgment request 132, stores its identity as element 162-5 in the stack 160-5, and sends the message 132 to the destination PE5 142.

Exemplary destination router 142 is operational, and accordingly, generates the acknowledgment response message 134, including the return address stack 160. PE5 142 then pops the first return address 162-5 off the stack 160-5 and employs the value (ASBR4) 150-4 as the first routing hop for the acknowledgment response message 134. Since the routers LSRn and ARBRn are employing a label switch path routing mechanism, as indicated above, IP addresses are not employed to identify the next hop. Rather, the path identity, local within the AS 110, identifies each respective router 150. Accordingly, each successive router 150-1 . . . 150-4 on the path 170 pops (retrieves) the next successive return address 162 off the stack 160 as the next hop for the acknowledgment response 134. Upon arrival at ASBR1 150, only the originator 140 return address 162-1 remains on the stack 160, and ASBR1 forwards the acknowledgment response 134 to PE1 140, completing the exemplary acknowledgment response indicating a positive (reachable) path from PE1 to PE5. Further, additional routing logic, including negative (node unreachable) operation is performable by the ASBR and LSR routers in the event of unreachability of the destination 142, discussed further below. A set of forwarding rules 152 enables routing decisions and logic for directing the messages 132 and 134.

FIGS. 4-7 are a flowchart of the LSP ping control flow and routing decisions between a plurality of autonomous systems 110 in greater detail in the exemplary network of FIG. 3. Referring to FIGS. 3-7, in an exemplary VPN network environment 101 suitable for use with the present invention including multiple autonomous systems 110 interconnected by autonomous system border routers (ASBRs) 150, an originator node 140 assesses the state (i.e. reachability) of a remote node 142 via a series of labeled switch paths through autonomous systems 110. The originator 140 identifies the remote node 142 from which an acknowledging response (i.e. ping reply) is requested, in which the remote node corresponds to a path 170 including a sequence of border routers 150-1 . . . 150-4 (150, generally), as depicted at step 300. It should be noted that the path 170 includes the series of LSPs through each of the respective AS encountered between the originator 140 and destination 142, since, as indicated above, each particular LSP assigned by an ASBR does not persist beyond the assigning AS.

The originating node 140 stores an entry PE1 as entry 162-1 in the stack 160-1 indicative of the originator (itself) 140 of the acknowledgment response request message 132, as disclosed at step 201. In the exemplary configuration disclosed, the entry is a return address stack 160 stored in the message 132, and the stored entry 162-1 yields the return address PE1. The originating node 140 then transmits, from the originator node 140, the response request message 132 to a border router 150-1 included in the path 170 to the remote node 142, as shown at step 302. As indicated above, the ASBR 150 nodes are LSP routers and employ a label to identify a specific path to the next ASBR 150. Accordingly, the path 170 is defined through each of the subnetworks, or autonomous systems 110, via a predetermined label, or labeled switch path, in which the predetermined label is operable to be recognized by the border routers 150 within the respective subnetwork 110, as depicted at step 303. The border router ASBR1 150-1 therefore receives the response request message 132 including the return address stack 160-1.

At each of the successive border routers 150-2, 150-3 and 150-4 in the exemplary network, the ASBRs 150 accumulate, in a nondestructive manner, an entry 162 indicative of the identity of each the successive border routers 150 on the path 170 to the remote node 142, as shown at step 304. In the exemplary configuration discussed herein, the set of accumulated entries 162 is stored as a stack 160 to facilitate redirection of the response 134 back along the path 125. Such accumulation of entries 162 indicative of successive border routers 150 traversed on the path 170 to the identified remote node 142 further includes building the stack 160 of successive edge nodes 150, in which the stack 160 corresponds to a normalized field in the acknowledgement request message 132, as depicted at step 305. Each of the ASBRs 150 stores the accumulated entries 162 as a stack of return address 160-N, in which the stack has a first address (i.e. the originator PE1) and successive addressees indicative of the ordered set of border routers 150 traversed by the response request 132, in which each node 150 (e.g. router) writes its identity to the next element 162 on the stack 160, as shown at step 306. As each ASBR 150 accumulates the entries 162 by writing the entries to the stack 160, the non destructive manner avoids overwriting successive accumulated entries 162-N such that retrieval of the entries is performable in a reverse order from which they were written, as depicted at step 307. Therefore, ASBR1 writes entry 162-2, building the return address stack shown at 160-2, ASBR2 writes entry 162-3, shown as stack 160-3, ASBR3 writes entry 162-4, shown as stack 160-4, and ASBR4 pushes entry 162-5, shown as return address stack 160-5, therefore transmitting the response request message 132 to each of the successive border routers 150 on the path 170 to the remote node 142, as disclosed at step 308. In the particular exemplary configuration, an alert flag such as the above described TTL field is set to ensure examination by successive border routers (ASBRs).

At each AS 110 traversed, a check is performed to determine if another AS is to be traversed to reach the destination node 142, as depicted at step 309. Accordingly, if there are more border routers 150 to traverse, then the acknowledgment request message 132 is passed to the next ASBR 150, thus continuing to traverse the plurality of subnetworks 110 defined by border routers 150 indicative of ingress points to the respective subnetwork 110, in which each of the subnetworks is an autonomous system having an independent routing policy, as shown at step 310, and control iterates to step 304 accordingly. Further, in alternate configurations, successive return addresses are stored by the border routers 150, such that the border routers 150 retain an identity of the previous border router 150 indicative of the last hop in the previous autonomous system traversed by the message, rather than or in addition to retaining the stack 160 and return address entries 162-N in the response request message 132.

Upon ingress into the last AS 110-13 on the path 170, the destination node 142 receives the acknowledgment request message 132, and builds an acknowledgment request response 134 including the stack 160 of return path routing information 162 accumulated in the acknowledgment (response) request 132; as depicted at step 311. It should be noted that, as will be discussed further below, if the response request 132 cannot be routed to the ping destination 142, thus indicating unreachability of the destination "ping" node 142, the ASBR 150 encountering unreachability identifies an error in routing, thus indicating a nonresponsive ping.

In the positive ping scenario (i.e. pinged node is reachable), the destination 142 forwards the recently generated request response 134, or acknowledgment response, to the originator 140, as disclosed at step 312. Accordingly, the originator 142 retrieves the first address 162-5 on the stack 160-5, such that the return address 162-N placed on the stack previous 162-(N−1) to the first address is the current first return address on the stack (i.e. a "pop" operation, as is known in the art), as shown at step 312. PE5 142 then transmits the acknowledgment request response 134 to the first (i.e. "popped") return address ASBR4 from the stack 160-5, as depicted at step 313.

Similar to the response request 132, the acknowledgment response 134 causes the ASBRs 150 to repeat the retrieval and transmitting for each successive address 162 on the return address stack 160 until the originator 140 receives the acknowledgement response 134, as depicted at step 314. In particular configurations, at each successive border router 150, forwarding occurs according to forwarding rules, as depicted at step 315, in which the forwarding rules 152 further include a bi-directional analysis of the response request 132 or acknowledgment response 134, as the case may be.

The forwarding rules 152 analyze the messages 132, 134 and direct the ASBR 150 to transmit, if an acknowledgment request 132 is received, to the next route toward the ping destination 142, as shown at step 316; to redirect, if an acknowledgment response 134 is received, to the next address 162 on the stack 160, the ping response 134, as shown at step 317; and to identify, if the destination cannot be reached, the AS 110 or ASBR 150 encountering the unreachability condition, as depicted at step 318.

A check is performed, at step 319, to determine if an error is encountered by an ASBR 150 in routing (forwarding or redirecting) the request/response message 132/134, as disclosed at step 319. If an ASBR 150 encounters an error transmitting one of the acknowledgement request 132 and the acknowledgment response 134, the ASBR erases a routing history indicative of the path 170, therefore avoiding dissemination of security sensitive routing/path information, as shown at step 320.

For such LSP failure cases, it is often the case that MPLS is not enabled on a router, or the label is missing, etc. In operation, it may be the case that the router with the failure could not just fast switch the labeled packet and would be forced to "look at" (i.e. examine) the message due to the error condition. This "failure" router could be any type of router including PE, LSR or ASBR. Accordingly, if the stack of ASBR addresses that we have constructed is present on the request, then the "failing" router replies to the first ASBR address on our list, even though it might not itself be an ASBR.

At step 321, a check is performed to determine if multiple routing paths exist to an ASBR address 162 retrieved from the stack 160. If multiple paths exist between a first subnetwork 110-A and a second subnetwork 110-B, the accumulated addresses 162 are indicative of the path 170 of the acknowledgement request 132 such that the same path is enabled for the acknowledgement response 134, as depicted at step 322. Therefore, the return address stack 160 overrides routing table or other information indicative of an alternative path from a particular ASBR 150. Further, a LSP route is typically indicative of a particular path to an ASBR from within the ASBR, and therefore avoids forwarding to an ASBR which represents an alternate path.

Further, in particular configurations, when a LSP Ping encounters such a multipath situation, the receiving routers interoperate with an already existing equal-cost multipath (ECMP) tree trace. Configurations disclosed herein interoperate by 1) preserving the original IP source address or other structures such as address/path hashing, with respect to the multipath acknowledgement request message even across AS boundaries, and 2) Not modifying/destroying any of the existing structures of the LSP ping (such as the downstream mapping object). However, private address information may need be removed from downstream mapping, so it may have to be modified non-destructively. As with the transport of the response request 132, a check is performed to determine if there are additional border routers 150 to traverse on the path 170 to the originator node 140, as shown at step 323. If so, then control reverts to step 314 to transport the acknowledgment response 134 back to the originating node 140, using successively popped return addresses 162 from the return address stack 160 which collectively define the path 170 including the LSP routes through each AS 110.

Figure 8:
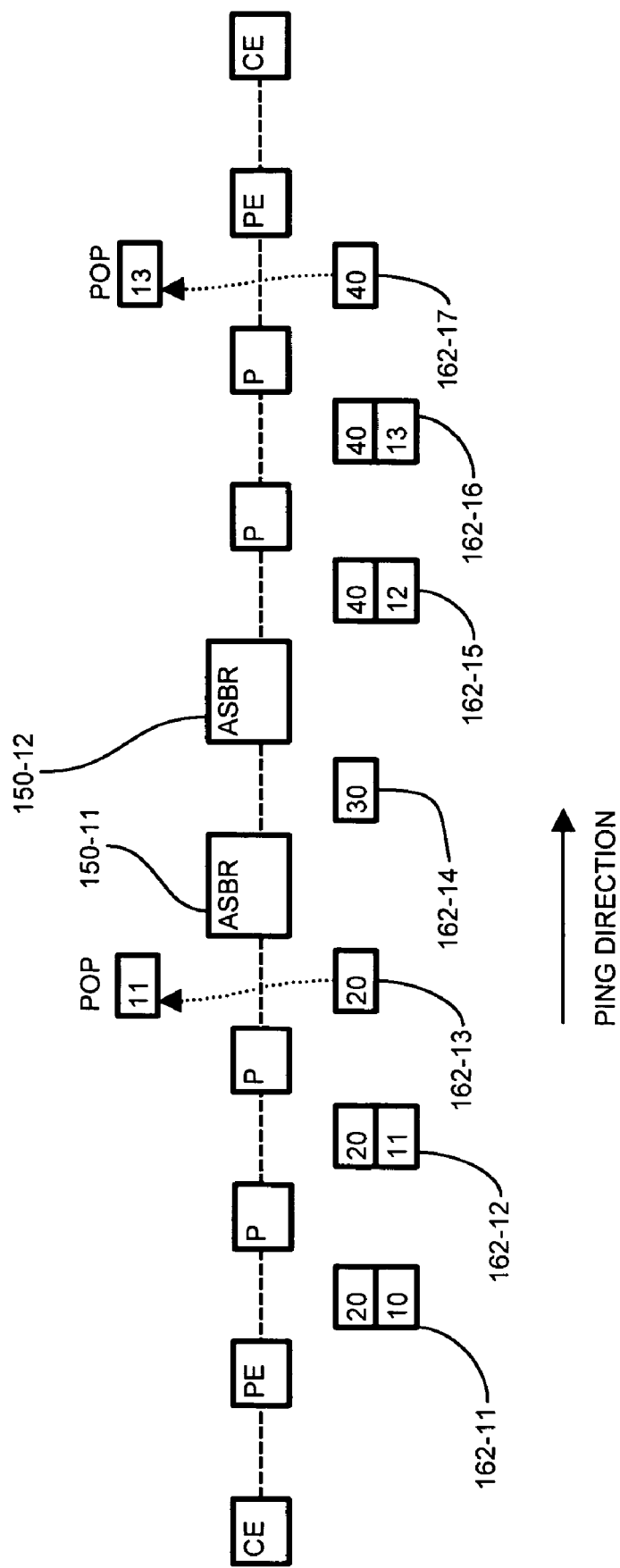
FIG. 8 is a block diagram of a Labeled Switch Path between two autonomous systems.

FIG. 8 is a block diagram of an alternate router configuration illustrative of other aspects of the LSP ping operation. Referring to FIGS. 3 and 8, an exemplary routing sequence including customer edge routers (CE), provider edge routers (PE), provider routers (P), such as LSR routers, and ASBR routers. Stack 162 progression is shown via an LSP ping, or acknowledgment request message, between PE routers showing the stack 162 at increments 162-11 . . . 162-17. As indicated above, the ASBRs 150 pop the last address on the stack 162 to retain the path for the subsequent request response (ack) message. The intermediate (P) routers replace the last entry with their own. The first pop occurs at 162-13 with respect to label 11. The second pop occurs at 162-17 with respect to label 13. Accordingly, the diagram indicates that the ASBRs and PE receive the inner label only (i.e. that has TTL or other alert flag set to 1).

FIG. 8 illustrates the label stack 162 that is being sent for the packets between each router. Notice that some have 2 labels. Labels are in a stack 162, so between PE and P there are actually 2 labels on each packet. In the initial stack 162-11 from the originating PE, Label 10 is at the top of the stack above label 20. Notice there is no label between CE and PE. The LSP for this network actually goes from PE to PE, thus illustrating differences in employing the address stack in conjunction with LSP ping, rather than an IP ping. In this particular arrangement, the LSP ping traverses from PE to PE, not CE to CE (standard IP ping goes from CE to CE).

In accordance with typical LSP routing, labeled packets are fast switched though routers. Accordingly, unless something "happens" to the packet, it merely traverses through the network without scrutiny. In the exemplary LSP Ping scenario, if we blindly send a labeled acknowledgement request packet, it would be fast switched all the way to the CE where it would be dropped. To force it to be "looked at" (i.e. scrutinized by an ASBR), some kind of router alert is introduced. As indicated above, the TTL value is employed accordingly to trigger responsiveness to the LSP Ping messages. Similar to IP packets, each label has a TTL value. So for the packets between PE and P, there are actually 3 separate TTL values. One for the underlying IP packet, one for label 20 and one for label 10. Only the outer-most TTL is ever decremented at each hop (the one for label 10 in this case). To make the packet get "looked at" by an ASBR, we set the TTL value for the inner label (label 20) to a value of 1. So what happens is that an ASBR is the first router to ever see an outer label of 20. This label had its TTL set to 1 at the originator, so the packet will "TTL expire" at the ASBR. When the expiry happens, the ASBR 150 actually "looks at" the packet and notices that it is LSP ping. It then adds its own address to the stack and can restore it back onto the LSP. In doing so, it sets the inner most label TTL to 1 (now its a new label 30) so that the request will expire at the successive ASBR and the process continues. Accordingly, the acknowledgement request may not appear seamlessly sent from one ASBR 150 to the next ASBR, but rather is interrupted in its travel across the whole path 125 by such forced TTL expiries at each ASBR. Therefore, each ASBR sets the TTL (or some other mechanism like the special router alert label) in such a way that it gets "looked at" (interrupted) by the next ASBR or the final destination. Note that such processing does not apply to the reply message; routers will send these ASBR-to-ASBR via the stack that the acknowledgment request message 132 generated.

It is often mentioned above about the stack of ASBRs stored as a list of addresses. However, such a stack may be construed as reachability information, or other type of return path routing information, in alternate implementations. In particular configurations, an IP or LSP address may be augmented with, for example, a route distinguisher or some other mechanism to specify which VPN the address came from. On aspect of this approach is that when the response 134 comes back to an ASBR 150, it has sufficient information to get the response back to the next ASBR 150 (or the originator 140).

In a typical exemplary VPN, it may be an observed practice that the P routers should always be hidden to any outside AS. In many cases PEs should be as well. ASBRs are normally "publicly" known however. Alternatively, ASBRs may be known only by their directly neighboring AS. So as an acknowledgement reply is returned to each ASBR, the ASBR may remove all information about P and PE routers, as discussed above. Further, the stack 162 may also maintain a list of the ASBRs 150-N that the reply 134 has passed through so when the reply 134 reaches the originator 140, it has exactly the path of ASBRs 150 that the ping reached.

Such visibility is often known as a "peering" between routers. Normally the peering is a private peering so the ASBRs 150 are known between the two peering entities. Such an approach may trigger security implications in particular configurations. However, the sender may not have a peering agreement with the receiver and in this case we should not divulge any IP information to the sender. Configurations discussed herein, therefore, maintain such information within the transiting AS so that the end-to-end path can be determined.

In further detail regarding peering, in particular arrangement, for the two networks that are peering, the ASBR is known between the two entities, hence even in private peering ASBRs are well known to the routers in the network because the Border Gateway Protocol (BGP) next hop is advertised. Accordingly, the designation "publicly known" is relevant to the two networks in question. Such unknown PEs may be taken to imply that no PE loopbacks are leaked. A distinction should be made between a VPN context and the Internet at large. Public means "Internet" to most observers. However, it may not be sufficient to assume that only 2 AS's are involved. Take a topology such as A-B-C, for example. Public generally means that A knows the addresses of B and C, as they would typically be advertised. Private means that A only knows about B but may learn information about C via B. For example, in the case where you have A-B-C, A,B&C are AS's. In this case, any destinations reachable via C are known to A as being reachable via B. A does not know anything about C's addresses. However, if you put that IP information within the LSP-ping return then A now has this information which it did not have before. In the exemplary configurations herein, the VPN context is distinguishable from a general Internet environment, as the VPN/MPLS overlays and/or supplements Internet connectivity with various transparent security and connectivity measures to provide the VPN environment. Accordingly, methods and operations discussed herein are operable on the Internet, within a private intranet, and over various combinations of public and proprietary networks.

In particular configurations, in order to preserve the original functionality of the LSP ping in a topology with just a single AS, the method adds the address stack at the first ASBR instead of at the originator 140. Accordingly, the LSP ping messages do not need to be changed at all unless an inter-AS situation is encountered. The first ASBR 150 in the path 125 can push on both its address and the address of the originator (originator being the IP source address of the ping).

Those skilled in the art should readily appreciate that the programs and methods for performing ping operations between ASBRs using LSP routing as defined herein are deliverable to a processing device in many forms, including but not limited to a) information permanently stored on non-writeable storage media such as ROM devices, or b) information alterably stored on writeable storage media such as floppy disks, magnetic tapes, CDs, RAM devices, and other magnetic and optical media. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for performing ping operations between ASBRs using LSP routing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of assessing a state of a remote node via a label switched path, the method comprising:
    receiving a response request message from an originator node at an autonomous system border router, the autonomous system border router included in a plurality of autonomous system border routers on the label switched path between the originator node and the remote node;
    transmitting the response request message to each successive one of the autonomous system border routers as the response request message traverses the autonomous system border routers on the label switched path to the remote node;
    accumulating, in a nondestructive manner at each successive one of the autonomous system border routers, an entry indicative of an identity of each successive one of the autonomous system border routers traversed on the label switched path to the remote node, wherein accumulating the entry indicative of the identity of each successive one of the autonomous system border routers further comprises building a stack of accumulated entries indicative of identities of the autonomous system border routers in the response request message;
    traversing the label switched path back to the originator node based on the stack of accumulated entries included in the acknowledgement response message; and
    forwarding messages at each respective one of the autonomous system border routers according to forwarding rules, the forwarding rules directing the respective one of the autonomous system border routers to:
    transmit the response request message, if the response request message is received, to a next route toward the remote node;
    redirect the acknowledgment response message, if the acknowledgment response message is received, to a next address on the stack of accumulated entries; and
    identify, if the response request message cannot reach the remote node, an autonomous system or the respective one of the autonomous system border routers encountering a condition of the response request message being unable to reach the remote node.

2. The method of claim 1 further comprising traversing a plurality of subnetworks defined by the autonomous system border routers indicative of ingress points to a respective one of the subnetworks, each one of the subnetworks being an autonomous system having an independent routing policy.

3. The method of claim 2 wherein the label switched path is defined through each of the subnetworks via a predetermined label switched path label, the predetermined label switched path label operable to be recognized by the autonomous system border routers within the subnetworks.

4. The method of claim 3 wherein the nondestructive manner avoids overwriting successive accumulated entries such that retrieval of the accumulated entries is performable in a reverse order from which the accumulated entries were written.

5. The method of claim 1 wherein building the stack of accumulated entries further comprises storing the accumulated entries as a stack of return addresses, the stack including a first address and successive addresses indicative of an ordered set of border nodes traversed by the response request message.

6. The method of claim 5 wherein the accumulated entries are written to the stack in an ordered manner indicative of the label switched path, further comprising:
    receiving, at the remote node, the response request message;
    building the acknowledgment response message by including the stack of accumulated entries in the acknowledgment response message; and
    transmitting the acknowledgment response message to a first return address on the stack.

7. The method of claim 6 further comprising forwarding the acknowledgment response message to the originator node, forwarding further comprising:
    retrieving the first return address on the stack, such that a second return address placed on the stack previous to the first return address is a current first return address on the stack;
    transmitting the acknowledgment response message to the current first return address; and
    repeating the retrieval and transmitting for each successive address on the return address stack until the originator node receives the acknowledgment response message.

8. The method of claim 6 further comprising, upon traversing an autonomous system, transmitting at least one of the response request message and the acknowledgment response message, erasing a routing history indicative of the label switched path; and
    selectively, if an error condition is encountered, sending the response request message to a last address on the stack.

9. The method of claim 8 wherein multiple paths exist between a first subnetwork and a second subnetwork, and the accumulated addresses are indicative of a path of the response request message such that the same path is traversed for the acknowledgment response message.

10. The method of claim 9 wherein successive return path routing information are stored by the autonomous system border routers, the autonomous system border routers retaining an identity of the previous autonomous system border router indicative of a last hop in a previous autonomous system traversed by the response request message.

11. The method of claim 1 wherein the forwarding rules directing the respective one of the autonomous system border routers further comprises the forwarding rules directing the respective one of the autonomous system border routers to transmit the response request message by setting a time-to-live (TTL) value of the response request message to a value of 1.

12. A data communications device for performing ping operations between autonomous system border routers (AS-BRs) using label switched path (LSP) routing comprising:
 a network interface operable to identify a remote node from which an acknowledging response is requested, the remote node corresponding to a label switched path, wherein the label switched path includes the ASBRs;
 a return address stack operable to store an entry indicative of an identity of an originator node of a response request message;
 a routing processor operable to forward messages in accordance with forwarding rules, wherein the forwarding rules direct the routing processor to:
 to transmit the response request message, if the response request message is received, from any one of the ASBRs to a next respective one of the ASBRs on the label switched path toward the remote node;
 accumulate, in a nondestructive manner at each successive one of the ASBRs, a stack of accumulated entries indicative of an identity of each successive one of the ASBRs traversed on the label switched path to the remote node by the response request message, wherein the stack of accumulated entries is for inclusion in an acknowledgement response message;
 forward the acknowledgement response message, if the acknowledgement response message is received, toward the originator node based on the stack of accumulated entries; and
 identify, if the response request message cannot reach the remote node, an autonomous system or one of the ASBRs encountering a condition of the response request message being unable to reach the remote node.

13. The data communications device of claim 12, wherein the network interface couples a plurality of subnetworks defined by ASBRs indicative of ingress points to the respective subnetwork, each of the subnetworks being a corresponding autonomous system having an independent routing policy.

14. The data communications device of claim 13 wherein the label switched path is defined through each of the subnetworks via a predetermined label, the predetermined label operable to be recognized by the ASBRs within a respective subnetwork.

15. The data communications device of claim 14 wherein the return address stack is operable to accumulate entries in an non destructive manner which avoids overwriting successive accumulated entries such that retrieval of the entries is performable in a reverse order from which they were written.

16. The data communications device of claim 12 wherein the router processor is operable to store the accumulated entries as a stack of return address, the stack having a first address and successive addresses indicative of an ordered set of border nodes traversed by the response request message.

17. The data communications device of claim 16 wherein the accumulated entries are written to the stack of return addresses in an ordered manner indicative of the label switched path, the remote node further operable to:
 receive, at the remote node, the response request message;
 build the acknowledgment response message to include the stack of return addresses; and
 transmit the acknowledgment response message to the first return address on the stack of return address.

18. The data communications device of claim 17 wherein each receiver of the acknowledgement response further comprises forwarding rules, wherein the forwarding rules, in order to forward the acknowledgment response message to the originator, are further operable to:
 retrieve the first address on the stack of return address, such that the return address placed on the stack previous to the first address is the current first return address on the stack of return address;
 transmit the acknowledgment response message to the retrieved first address; and
 repeat the retrieval and transmission at each receiver until the originator receives the acknowledgement response message.

19. The data communications device of claim 16 wherein the stack of accumulated entries is operable to preserve an original IP source address of the response request message across autonomous system (AS) boundaries, and further operable to avoid modification of existing structures of an LSP ping routing history.

20. The data communications device of claim 19 wherein the routing processor is further operable to maintain a list of the ASBRs that the acknowledgement response message has passed through such that the acknowledgment response message delivers to the originator node the path of the ASBRs that the response request message reached.

21. The data communications device of claim 16 wherein the routing processor is further operable to set, at each one of the ASBRs traversed by the response request message, a router alert label, operable to trigger an interrupt response and examination by at least one successive one of the ASBRs, such that label switch routing avoids ignoring the response request message.

22. The data communications device of claim 21 wherein the routing processor is further operable to append additional routing identifiers corresponding to the return addresses operable to identify an appropriate routing table for routing the acknowledgement response message.

23. A computer program product having a non-transitory computer readable medium operable to store computer program logic embodied in computer program code encoded thereon for assessing the state of a remote node via a labeled switch path comprising:
 computer code for receiving a response request message from an originator node at an autonomous system border router, the autonomous system border router included in a plurality of autonomous system border routers on the label switched path between the originator node and the remote node;
 computer code for transmitting the response request message to each successive one of the autonomous system border routers as the response request message traverses the autonomous system border routers on the label switched path to the remote node;
 computer code for accumulating, in a nondestructive manner at each successive one of the autonomous system border routers, an entry indicative of an identity of each successive one of the autonomous system border routers traversed on the label switched path to the remote node, wherein accumulating the entry indicative of the identity of each successive one of the autonomous system border routers further comprises building a stack of accumulated entries indicative of identities of the autonomous system border routers in the response request message;

computer code for traversing the label switched path back to the originator node based on the stack of accumulated entries included in the acknowledgement response message; and computer code for forwarding messages at each respective one of the autonomous system border routers according to forwarding rules, the forwarding rules directing the respective one of the autonomous system border routers to:

transmit the response request message, if the response request message is received, to a next route toward the remote node;

redirect the acknowledgment response message, if the acknowledgment response message is received, to a next address on the stack of accumulated entries; and identify, if the response request message cannot reach the remote node, an autonomous system or the respective one of the autonomous system border routers encountering a condition of the response request message being unable to reach the remote node.

24. A data communications device for performing ping operations between autonomous system border routers (AS-BRs) using label switched path (LSP) routing comprising:

means for identifying a remote node from which an acknowledging response is requested, the remote node corresponding to a label switch path, the label switched path including a sequence of border routers;

means for storing an entry indicative of an identity of an originator node of an acknowledging response request in a response request message;

means for receiving, from the originator node, the response request message at a border router included on the label switched path to the remote node;

means for transmitting the response request message to successive border routers on the label switched path to the remote node, wherein each one of the successive border routers forwards the response request message to a next one of the successive border routers;

means for accumulating, in a nondestructive manner at each successive border router, an entry indicative of an identity of each one of the successive border routers on the label switched path to the remote node, the accumulated entries indicative of the successive border routers stored on a stack;

means for coupling to a plurality of subnetworks defined by border routers indicative of ingress points to the respective subnetwork, each of the subnetworks being an autonomous system having an independent routing policy;

means for forwarding to the plurality of subnetworks, the forwarding occurring according to forwarding rules, the forwarding rules further including rules to:

transmit, if an acknowledgment request is received, to a next route toward the remote node defining a ping destination;

redirect toward the originator node, if an acknowledgment response is received, to the next address on the stack of the accumulated entries, the acknowledgement response; and identify, if the remote node cannot be reached, an autonomous system encountering a condition of the response request message being unable to reach the remote node.

* * * * *